INVENTOR.
EDGAR A. LAURING

United States Patent Office 2,971,856
Patented Feb. 14, 1961

2,971,856
SURFACE DECORATED FIBERBOARD AND METHOD OF MAKING THE SAME

Edgar A. Lauring, International Falls, Minn., assignor to Minnesota and Ontario Paper Company, Minneapolis, Minn.

Filed Mar. 8, 1957, Ser. No. 644,799

7 Claims. (Cl. 117—10)

This invention relates to the beautification of ligno-cellulosic panels, and more particularly to the embellishment of certain surfaces of hot pressed products.

An object of the invention is to provide a new decorative and protective surface coating to a board-like material and a method of applying the same.

Other and further objects of the invention and the advantages of the same will be pointed out hereinafter and indicated in the appended claims or will be obvious to one skilled in the art upon understanding the present disclosure.

Sheet material such as hardboards made in accordance with patents, such as United States Patents 2,030,625 and 2,134,659, can be economically and successfully surface decorated by the new process. The consolidated board-like product disclosed in a co-pending application, Serial No. 358,482 filed May 29, 1953 now abandoned, can be very economically decorated by the new process.

Reference is to be had to the accompanying drawings forming a part of this specification in which.

Figure 1:
Figure 1 is a diagrammatical illustration of the steps in production of hot pressed fiberboard.

Ligno-cellulosic material may be formed into board-like products in any suitable manner and such boards are then supplied to a press loader from where it is moved to a heated hydraulic press. In the press it is subjected to simultaneous application of heat and pressure, for example, 100 to 1,000 pounds pressure per square inch and a temperature of about 400° F. to about 470° F. for a period of time varying from about two minutes to about 15 minutes. The hot pressed board is by suitable means removed from the press and then passed through a temperature control apparatus to bring the surface temperature of the board to within the range of about 250° F. to about 325° F. The hot board while hot is given a sealing and a primer coating application. The coating or coatings are dried in part, at least, by the internal heat of the board and the coating is subjected to a brush operation before the coating is completely dried.

The board 10, having a temperature not lower than about 250° F., receives suitable coating material from conduit 12. The coating is smoothed by suitable means such as coating roll 14. It is to be understood that any suitable coating means may be employed. Coating material is applied to the opposite surface, if desired, by coating roll 16 so arranged as to obtain coating material from coating container 18. After the coating has been applied, one or both coated surfaces are subjected to rotating brush or brushes 20. The board, while being brushed, is moved under the brush by suitable means such as driven rolls 22.

Figure 2:
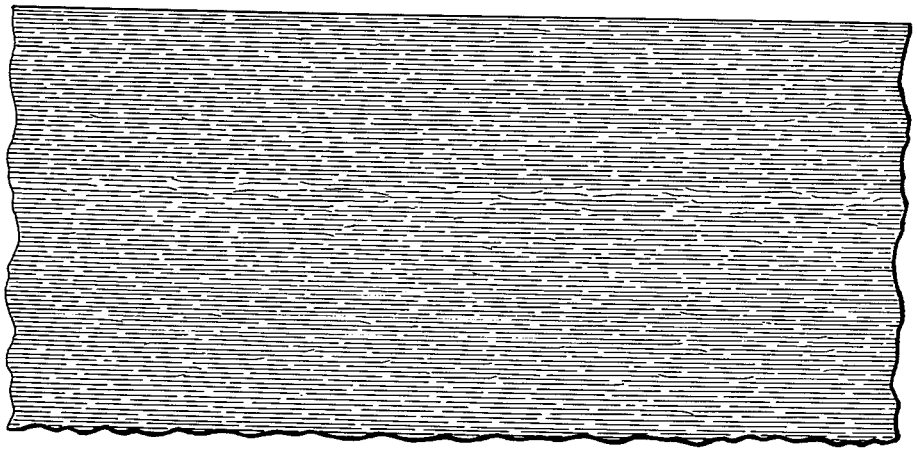
Figure 2 is a top plan view, with portions broken away, of a board with decorative surface in accordance with the new method; and, Figure 3 is a diagrammatical illustration of coating and decorating a board-like product.
Figure 3:
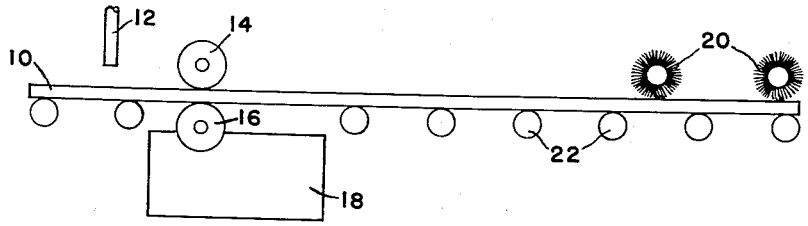

The grained-like appearance of the surface coating, as shown in Figure 2, requires inter alia a board having a surface temperature not less than about 250° F. There are a number of variables that may occur in the process and still obtain substantially the same surface appearance.

For a given coating material the following are variables that may be resorted to:

(1) Viscosity of coating material.
(2) Temperature of the board (temperature not less than about 250° F. must be used).
(3) Amount of coating applied.
(4) R.p.m. of the brushes.
(5) Number of brushes employed.
(6) Fiber sizes of brushes.
(7) Density of brush (amount of fiber).
(8) Arrangement of fiber in brushes.
(9) Distance between brushes.
(10) Speed of board.
(11) Volatility of coating solvent.

In general a finer grain is obtained from a higher:

a. Viscosity of coating material.
b. Higher r.p.m. of brushes or brush.
c. Stiffer fiber in the brush or brushes.
d. Greater the distance between brushes (no effect after coating has set).
e. Higher the temperature employed.

An example of a coating material that can be employed:

750 grams of varnish with driers.
870 grams of $BaSO_4$.
140 grams of clay.
140 grams of talc.
350 grams of $TiO_2$.

The varnish consists of 100 pounds of phenolic resin to 40 gallons of tung oil. Dryers may be added to the varnish and consist of .5% of lead, .05% of cobalt, .05% of manganese as metals based upon the oil content. Generally, it is preferred to add .5% based upon the varnish solids of a suitable anti-skinning agent. The maximum temperature of the board depends upon the coating material used. For the coating set forth in the example, the board should not exceed about 400° F.

Examples of operating conditions giving appearances similar to that shown in Figure 2:

(A)

(1) Brushes having short stiff bristles.
(2) 60 r.p.m.—brush speed—with two brushes employed and spaced 14" apart.
(3) 60 feet per minute—board speed.
(4) Coating—Minnesota, Hercules (similar to that set forth in example).
(5) Board temperature—about 250° to about 300° F.
(6) Solvent—mineral spirits.
(7) Viscosity—15 centipoises.

(B)

(1) Brushes having long and soft bristles.
(2) R.p.m. brushes—100.
(3) Viscosity—12 centipoises.
(4) All other conditions similar to those in (A).

It is to be understood that the maximum r.p.m. of the brush or brushes shall not exceed the speed at which throwing of paint begins. (This condition relates in part to viscosity of coating material.)

There are advantages obtained from running the brushes as fast as possible with the viscosity of the coating material low. With the coating material set forth in the example, the temperature is maintained at about 80° F. This temperature may be controlled by heat exchangers. Some of the reasons for temperature control relate to viscosity and also to flash point of the coating material.

The graining in general includes substantially parallel ridges with the ridges being discontinuous. The brushing is performed when the coating material is only partially dried, some drying must occur prior to brushing. The time between the application of the coating material and the brushing depends in part on the temperature of the board, viscosity of the coating material, and the rate of travel of the coated board.

What is claimed:

1. A process of coating and decorating a hot pressed vegetable fiber board, comprising applying a pigmented oil coating composition to a hot pressed vegetable fiber board having a surface temperature not less than about 250° F., drying the said coating composition by the internal heat of board for a predetermined time, and then passing the coated board under at least one rotating brush while the surface of the coating is partially dried by the said internal heat.

2. A process of decorating and coating a hot pressed ligno-cellulose board comprising reducing the temperature of the board to within the range of excess of about 250° F., to about 325° F., applying a pigmented coating containing a phenolic resin to at least one surface of the said board, drying the applied coating for a predetermined time by the internal heat of the board and then brushing the coated surface after a predetermined length of such drying and before complete drying of said coating.

3. The process of decorating and coating the surface of hot pressed ligno-cellulose board comprising adjusting the surface temperature of the board to within the range of an excess of about 250° F. to about 325° F., advancing the heated board at a predetermined rate, applying a pigmented oil coating containing a fusible resin to at least one surface, permitting the coating to partially dry by internal heat of the board and after a predetermined amount of such drying, and then brushing the coated surface by spaced apart rotatable brushes.

4. Process of priming, coating and decorating the surface of a hot pressed ligno-cellulose board comprising hot pressing a ligno-cellulose board at a temperature in excess of 400° F. to about 475° F., reducing the temperature of the hot pressed board to within the range of about 250° F. to 375° F., advancing the heated board at a predetermined rate, applying pigmented oil coating to at least one surface of the advancing board, continuing to advance the coated board and permitting the coating to partially dry by the internal heat of the board and then brushing such partially dry coated board by spaced apart rotatable brushes.

5. The process of priming, coating and decorating the surface of a ligno-cellulose board comprising hot pressing the board at a temperature in the excess of 400° F., adjusting the temperature of the board to within the range of 250° to about 325° F., continually advancing the board, applying to at least one surface of the board a pigmented oil coating containing fusible phenolic resin, maintaining and pigmented coating at a temperature of about 80° F. before application, partially drying the coating by the internal heat of the board and then brushing the surface with spaced apart rotatable brushes after a predetermined amount of such drying.

6. The process of coating and decorating the surface of a hot pressed vegetable fiber board comprising hot pressing of vegetable fiber board at a temperature in excess of 400° F. to about 470° F., reducing the temperature to within the range of about 250° F. to about 325° F. continually advancing the board, maintaining a pigmented oil coating at a temperature of about 80° F. before application applying to at least one surface of the advancing board, said pigmented oil coating having a temperature of about 80° F. before application, partially drying the coated surface by the internal heat of the board and then brushing the partially dried coated surface of the board with rotatable brushes.

7. The process of priming, coating and decorating a hot pressed ligno-cellulose board comprising hot pressing the board at a temperature in the range of 400° F. to about 470° F., reducing the temperature of the hot pressed board to within a range of about 250° F. to about 325° F., continually advancing the board, applying a pigmented oil coating containing fusible phenolic resin to at least one surface of the advancing board, permitting the coating to partially dry by the internal heat of the board, and after a predetermined amount of drying and before the surface is completely dry, brushing the coated surface by spaced apart rotatable brushes.

References Cited in the file of this patent

UNITED STATES PATENTS

| | | |
|---|---|---|
| 269,144 | West | Dec. 12, 1882 |
| 1,472,884 | Pater | Nov. 6, 1923 |
| 1,902,522 | Rose | Mar. 21, 1933 |
| 2,030,625 | Ellis | Feb. 11, 1936 |
| 2,033,411 | Carson | Mar. 10, 1936 |
| 2,208,236 | Wiener | July 16, 1940 |
| 2,363,658 | Decker | Nov. 28, 1944 |
| 2,657,153 | Russell | Oct. 27, 1953 |
| 2,863,364 | Rosenquist et al. | Dec. 9, 1958 |